United States Patent [19]

Achter et al.

[11] 4,254,460
[45] Mar. 3, 1981

[54] PROGRAMMABLE CONTROLLER

[75] Inventors: Eugene K. Achter, Gaithersburg; David A. Lohr, Ellicott City; Michael B. Uffer, Baltimore, all of Md.

[73] Assignee: Baxter Travenol Laboratories, Inc., Deerfield, Ill.

[21] Appl. No.: 50,354

[22] Filed: Jun. 20, 1979

[51] Int. Cl.³ .................. G06F 15/46; G01N 33/16
[52] U.S. Cl. .................. 364/104; 307/141; 364/497; 364/500; 422/62
[58] Field of Search ............ 364/104, 107, 497–500; 422/62–67; 307/38–41, 141, 141.4, 141.8

[56] References Cited

U.S. PATENT DOCUMENTS

| | | | |
|---|---|---|---|
| 3,748,044 | 7/1973 | Liston | 422/64 X |
| 3,873,273 | 3/1975 | Moran et al. | 422/64 |
| 3,969,703 | 7/1976 | Kwiatkowski et al. | 364/104 X |
| 3,986,372 | 10/1976 | Karklys | 307/141 X |
| 4,058,367 | 11/1977 | Gilford et al. | 422/63 |
| 4,115,861 | 9/1978 | Allington | 364/104 X |
| 4,184,347 | 1/1980 | Tobita et al. | 364/104 X |

*Primary Examiner*—Joseph F. Ruggiero
*Attorney, Agent, or Firm*—Robert A. Benziger; George H. Gerstman; Paul C. Flattery

[57] ABSTRACT

A controller is disclosed for controlling the operation of selected electro-mechanical devices without the use of a microprocessor or similar computing machines. The controller includes a memory programmed to output a data word each time the memory is advanced to its next successive memory address. Responsive to the data word, an electro-mechanical device, identified by the data word, is actuated to perform its function. As the function of an electro-mechanical device is completed, a sensor develops a control signal for altering the internal count of a counter. The counter, in turn, advances the memory to its next address for outputting its next data word. The cycle continues as the memory is advanced through its addresses and selected electro-mechanical devices are successively actuated to perform their assigned functions.

13 Claims, 4 Drawing Figures

PROGRAMMABLE CONTROLLER

BACKGROUND OF THE INVENTION

This invention relates generally to programmable controllers, and more specifically to programmable controllers for controlling the operation of electro-mechanical devices.

Conventional programmable controllers generally employ a microprocessor which is programmed to cause selected electro-mechanical devices (motors, solenoids, etc.) to operate in a predetermined sequence. Generally, the system utilizing the controller also includes sensors which detect the movement or operation of the electro-mechanical devices. The microprocessor, in turn, may continuously strobe the sensor to determine when the electro-mechanical devices have completed their assigned functions.

Although controllers utilizing microprocessors generally operate well, they suffer from the fact that a fairly large memory is required to carry out the type of functions described above. Hence, microprocessor controllers have been too expensive for some applications. Even more significantly, there are circumstances in which it is highly desirable to be able to change the sequence of operations of the electro-mechanical devices without incurring the expense of reprogramming a microprocessor. For example, in the field of immunology where laboratory samples are processed, sampled, and the like according to a known procedure, that procedure is subject to frequent change as advances are made in the art. To reprogram, test and de-bug a microprocessor to keep abreast of changes in the immunology art would be undesirable from a time and complexity standpoint. Hence, microprocessor controllers are undesirable from a complexity and/or cost standpoint for a variety of applications.

OBJECTS OF THE INVENTION

It is a general object of the invention to provide an improved controller for controlling the operation of electro-mechanical devices and the like.

It is a more specific object of the invention to provide such a controller which does not employ a microprocessor.

It is another object of the invention to provide a controller which requires a relatively small, inexpensive memory, but which is capable of directing a large number of operations, for sensing when an operation is complete, and for automatically effecting further operations.

It is a further object of the invention to provide a versatile, easily modified controller which is particularly well suited to control a variety of treatments on laboratory samples.

BRIEF DESCRIPTION OF THE DRAWINGS

The above-stated objects and other objects of the invention are more particularly set forth in the following detailed description and in the accompanying drawings, of which.

SUMMARY OF THE INVENTION

The controller described herein is adapted to control the operation of a plurality of electro-mechanical devices by employing a memory such as a PROM which is programmed with a plurality of instructions for outputting a corresponding plurality of digital output signals or data words. Each output signal is selected to actuate at least one of a plurality of electro-mechanical devices to effect a predetermined function of the electro-mechanical device. In addition, each output signal is associated with a particular address in the memory.

The controller also includes means, such as an operator-actuatable switch, for indexing the memory to a first address, whereby the first output signal is developed by the memory for actuating a selected electro-mechanical device. Means responsive to the completion of the predetermined function of the actuated electro-mechanical device generates a control signal received by a counter. The counter, in turn, alters its count. The generated count is continuously transmitted to the memory device to specify the memory address. In this manner, the electro-mechanical devices are actuated to effect a selected sequence of functions and the completion of each function causes the counter to advance the memory to its next successive address for stepping selected electro-mechanical devices through their respective functions. Hence, the memory device and associated hardware serve the function of a microprocessor commonly found in controllers, but without the complexity and expense normally associated with microprocessors.

DESCRIPTION OF THE PREFERRED EMBODIMENT

Figure 1:
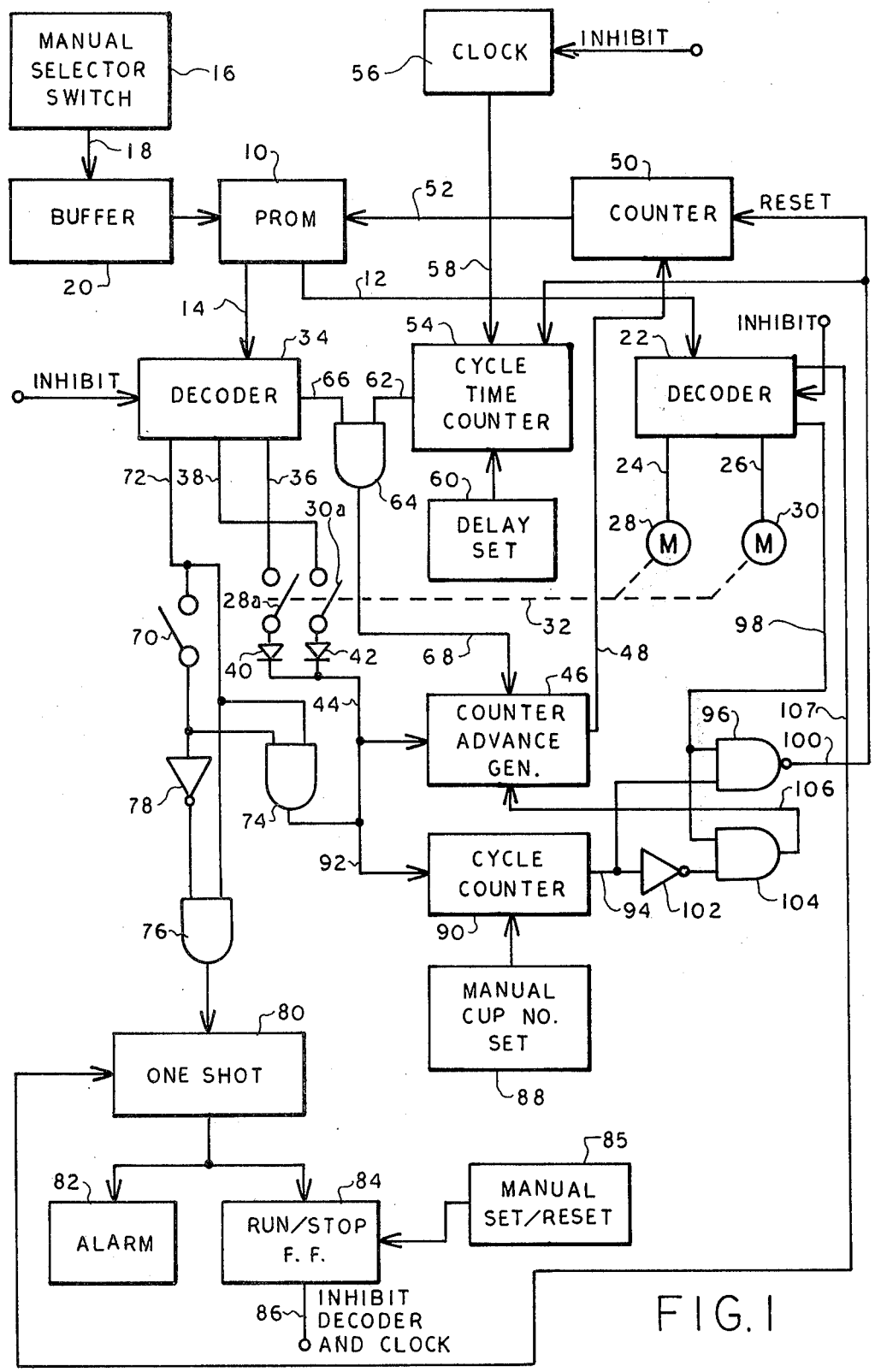
FIG. 1 is a functional block diagram of a controller embodying various aspects of the invention.

Referring now to FIG. 1, there is shown a functional block diagram of a controller embodying various aspects of the invention. The heart of the controller is a memory device illustrated as a PROM (programmable read only memory) 10 which is programmed to actuate a number of electro-mechanical devices for carrying out successive operations on a workpiece. Because various aspects of the illustrated embodiment have been designed for use in a laboratory environment, the controller is explained in terms of that specific application. It will be appreciated, however, that the controller is advantageously used in a variety of non-laboratory applications.

In its preferred form, the PROM 10 contains sequences of 8 bit data output words, each such word having two data sets and each word being associated with a particular address in memory. When the PROM 10 is advanced to a particular memory address, it outputs on leads 12 and 14, respectively, the first and second sets of data contained in the data word associated with the present memory address. It will be appreciated that the leads 12 and 14, and other leads shown in the drawings, are representative of a group of leads conveying data in parallel. For example, the leads 12 and 14 may each represent four leads which collectively carry four bits of digital data.

In addition to the PROM 10 having a plurality of distinct addresses each associated with a selected digital output word, those addresses are subdivided into different address regions. Each of the address regions contains a plurality of addresses and each region is associated with a different function to be effected by electro-mechanical devices. For example, where the controller is employed to automatically execute laboratory treatment of a sample (such as a serum), region 1 may contain digital output words or signals for causing the sample to undergo a particular protocol; region 2 may contain digital output signals for causing the same sample or a different sample to undergo a different protocol, and so on. The various successive addresses within a given memory region may, for example, cause an electro-mechanical device to fill a tube A with solution, to then add X milliliters of solution B to the tube, dispense the contents of the tube into a container C, and so on. Thus, advancing the PROM through all the addresses of a given memory region causes one or more electro-mechanical devices to effect the functions called for by the digital output signals until the entire protocol or treatment identified by that memory region has been completed.

In order to access a selected memory region for carrying out a particular treatment or protocol, each address of the PROM is preferably composed of binary address bits 0 through 9, with bits 6 through 9 identifying a particular region and bits 0 through 5 identifying particular addresses in a memory region.

To permit an operator to cause a selected protocol to be carried out, a manual selection switch 16 is provided. The switch 16 may be a conventional thumb-wheel type switch which develops a binary output signal indicative of the region selected by an operator. In the usual practice, the thumbwheel will carry human readable indicia associating each switch position with a particular protocol.

The signals developed by the switch 16 are carried by a lead 18 to a buffer 20, the latter of which inputs the received region address signals to the PROM. In response, the PROM is indexed to an initial address within the region specified by the operator, and the two four bit data words associated with that initial address are applied to the leads 12 and 14.

The data word applied to the lead 12 identifies a particular electro-mechanical device to be actuated for effecting a particular function. For example, the first data word may call for a motor to be energized for automatically dispensing a solution into a sample at a work station.

The data word applied to the lead 14 also identifies the electro-mechanical device to be actuated and is applied to a control signal generator which senses the completion of the function of the actuated device and generates a control signal in response to such completion. The control signals, in turn, are counted by a counter which advances the PROM to the next successive address as the counter is incremented. This cycle continues with the counter being incremented and the PROM being automatically advanced to the next address within the operator-selected memory region as the control signal generator senses the completion of a function of an actuated electro-mechanical device.

In the illustrated embodiment, the data on lead 12 is applied to a decoder 22 which converts the received data into actuating signals for actuating the electro-mechanical device identified by the received data. The actuating signals are applied to one or more of the decoder output leads 24, 26 for energizing the identified electro-mechanical devices, shown schematically as motors 28 and 30. The energized electro-mechanical device then performs its assigned function which may be, for example, lifting a dispensing device into position.

At this juncture it should be pointed out that the electro-mechanical devices may perform any pre-assigned function and the term "electro-mechanical" device is used in a comprehensive sense to include motors, solenoids, and the like and their associated circuitry for operating on the signals received from the decoder 22 to perform a pre-assigned task.

Assuming that the motor 28 has been energized, that motor will rotate to perform its function. When rotation is complete, the completed rotation of the motor may be translated by a coupling, indicated by the dashed line 32, to switch 28a for closure thereof. As described in more detail below, closure of the switch 28a results in advancing the PROM to the next successive address in memory for carrying out the next function described by the output data word associated with the next address.

Apparatus for closing the switch 28a in response to completed rotation of the motor 28 may take any of a number of conventional forms. For example, there may be mechanical coupling between the shaft of the motor 28 and the switch 28a, or a cam-cam follower arrangement may be utilized wherein the cam rotates with the motor 28 and the follower trips the switch 28a at a predetermined angle of rotation of the cam. Alternately, the motor 28 may drive another mechanical device whose movement is translated by a coupling to the switch 28a. In some applications, optical coupling may be employed such as utilizing a light source and photocell to sense motor motion and to actuate the switch 28a. Suffice it to say that the switch 28a is tripped whenever the motor 28 completes its assigned function.

As for the motor 30, it is also coupled as indicated to a switch 30a for closure thereof when the motor 30 has been actuated and completed its assigned function. Any number of motors or electro-mechanical devices may be driven by the decoder 22, although only two are shown. However, each device driven by the decoder 22 preferably trips an associated switch when its function has been completed. If it is desired to have a timed function rather than a mechanical function as, for example, an audible signal, this can be accomplished by including a timer and generating a completion signal when the timer times out.

Referring now to the data on the lead 14, that data is applied to a second decoder 34 for applying a control signal to its output leads 36, 38. In this embodiment, the control signal may be a binary signal which is applied to the switch 28a, 30a associated with the motor actuated by the decoder 22. Assuming that the motor 28 had been actuated, the decoder decodes the data on the lead 14 and applies the control signal to its output lead 36, whereby one side of the switch 28a is at the potential of the control signal.

The opposite sides of the switches 28a and 30a are coupled in parallel through diodes 40 and 42 and a lead 44 to an input of a counter advance generator 46. In response to the control signal, the generator 46 develops a signal at its output lead 48 for incrementing a counter 50. In response to its new internal count, the counter 50 signals the PROM via lead 52 for advancing the PROM to its next memory address within the operator-selected memory region.

Thus advanced to its next address, the PROM outputs at lead 12 another data word identifying an electro-mechanical device to be actuated. Simultaneously, a data word is fed to the decoder 34 via lead 14 to identify which electro-mechanical device is being actuated. The decoder 34, in turn, applies a control signal to one of the switches 28a, 30a associated with the actuated device.

When the actuated device has completed its function, its associated switch is closed via coupling 32, the control signal is applied to the generator 46, the counter 50 is incremented again, and the PROM is advanced to its next memory address. This cycle continues until each address in the selected memory region has been accessed via the counter 50, thus insuring that the entire treatment or protocol selected by the operator and the switch 16 has been completed.

Of significance is the fact that an entire treatment is carried out automatically in pre-arranged successive steps without the use of a microprocessor or other computing device. The PROM is a relatively simple, inexpensive device which is advanced through its addresses as each step of the protocol is finished. Accordingly, the memory device need not be able to compute, to have conditional loops, or to strobe or sense the completion of a function. The latter aspect is ably handled by the "hardwired" apparatus described above. Moreover, should a change to the protocol be desired, a new inexpensive PROM may be substituted having new data words. Alternately, where the memory device can be erased and reprogrammed, a new protocol can be established in that manner. Hence, the term "programmable controller" as used herein refers to a controller having a memory device which need not be capable of computing in the sense that a microprocessor "computes".

Where the controller is employed to perform a selected protocol or treatment on a workpiece at a work station, it is frequently advantageous to delay the controller after the completion of a selected portion of its protocol. For example, in a laboratory environment a particular protocol may include several successive functions effected on a laboratory sample while other equipment not controlled by the controller is concurrently effecting different functions on the sample. To synchronize the functions effected by the other equipment with the functions effected by the controller, it is advantageous to stop the controller at a selected point in its protocol, to incorporate a delay in the program at that point to allow the functions performed by the other equipment to be effected, and then to resume the programmed protocol. For this purpose, the controller includes timing means for determining the time elapsed during the protocol, for stopping the protocol at a selected memory address, and for resuming the protocol after a preselected delay.

In the illustrated embodiment, the timing means includes a cycle time counter 54 which counts pulses received on a lead 58 from a conventional clock 56.

The counter 54 is adapted to be pre-set by an operator-actuatable delay set 60 so that the counter will count up or down to a pre-set count, at which time it develops a high signal on its output lead 62. Preferably, the counter 54 is set to deliver its output at a time calculated to permit selected controller functions to be completed and to allow for additional time for the other equipment to complete its functions. When that time has elapsed, the high output from the counter 54 is applied to one input of an AND gate 64.

The other input to the AND gate 64 is developed at an output lead 66 of the decoder 34. To develop this other input, the PROM may be programmed such that its protocol includes an address and a corresponding output data word which does not actuate an electromechanical device, which occurs in the protocol at a point where the delay is desired, and which causes the output lead 66 of the decoder 34 to go high.

When both inputs to the AND gate are high, i.e., after the timer 54 "times out", the gate 64 develops a signal on a lead 68 for enabling the counter advance generator 46. In response, the generator 46 increments the counter 50 for advancing the PROM to its next address and for thereby resuming the selected protocol.

Any number of delays may be thus programmed into the PROM by including a corresponding number of delay set switches and cycle time counters. The length of the delays is adjustable by an operator who dials in the desired delay on the delay set switches. Once again, all this is achieved without the need for computation by the memory device.

A further aspect of the controller is particularly useful in applications where it is desired to perform the same protocol successively on a plurality of similar workpieces, each of which are advanced to a work station after the previous workpiece has been treated according to the protocol. In laboratory environments, for example, it is frequently the case where a plurality of samples contained in cups are to receive the same treatment or protocol. To automatically recycle the PROM through the same protocol for each sample, it is preferable to sense when a sample or other workpiece is at the work station to avoid trying to perform the protocol if the sample is missing or for some reason is late reaching the work station. Accordingly, the controller includes means including a switch 70 for sensing the presence of a new sample or workpiece at the work station. The switch 70 may be located at the work station and disposed such that it becomes closed when a sample is present and opens when the sample is advanced out of the work station.

To sense the status of the switch 70, the first, or one of the first, instructions in the protocol may cause the decoder 34 to generate a high signal at its output lead 72. That lead is coupled to one input of an AND gate 74, to one input of another AND gate 76, and to one side of the switch 70. The other side of the switch 70 is coupled to the other input of the AND gate 74 and, through an inverter 78, to the other input of the AND gate 76. Thus, when no sample is at the work station, the switch 70 is open, the AND gate 74 is disabled, and the AND gate 76 is enabled. The resultant output of the AND gate 76 triggers a one-shot 80 for sounding an alarm 82 and triggering a run/stop flip-flop 84. In turn, the flip-flop 84 develops an inhibit signal at its output 86 for inhibiting the decoders 22 and 34 and the clock 56, thus placing the controller in a "stop" mode.

The "stop" mode can only be disengaged by activation of a manual set-reset switch 85 which will reset flip-flop 84. Energization of alarm 82 indicating occurrence of the "stop" mode will automatically terminate with the timed deactivation of one-shot 80. In addition, if the sample cup is present, AND gate 74 is enabled for triggering the counter advance generator 46, whereby the counter 50 is incremented and the PROM advances to the next address in memory for starting the protocol.

To automatically recycle the same protocol for a number of samples, a manual cup number set switch 88 is provided by which an operator may dial in the number of cups of samples to be treated under the selected protocol. The output of the switch 88 sets that number as a count in a cycle counter 90. An input 92 of the counter 90 receives the output of the AND gate 74 so that the counter is decremented each time the switch 70 closes and a high output appears at lead 72 of the decoder 34. Hence, the counter 90 counts the number of samples treated under the protocol.

When the cycle counter has not been decremented to zero (indicating that at least one more sample remains to be treated) the output 94 of the counter 90 is high and is applied as one input to a NAND gate 96. The other input to the gate 96 is from output 98 of the decoder 22. At the next to the last step of each protocol, the PROM outputs a data word to the decoder 22 which causes its output 98 to go high momentarily. With both its inputs high, the gate 96 develops a reset signal at its output 100 for resetting the cycle time counter 54 and the counter 50. Resetting of the counter 50 automatically indexes the PROM to the first address of the selected protocol for applying that protocol to the next sample. The first instruction of the protocol may be to advance the next sample to the work station.

When the cycle counter 90 is decremented to zero (each sample having been treated), its output 94 goes low, theregby disabling the gate 96 to prevent the PROM from recycling. In addition, an inverter 102 applies a high to one input of an AND gate 104, the other input of which is received from the output 98 of the decoder 22. At the end of the last protocol, the output 98 goes high, whereby the gate 104 is enabled.

The output of the gate 104 is coupled to counter advance generator 46. The generator 46 advances the counter 50 which addresses the last instruction of the selected memory region of the PROM 10. The last instruction for each region is preferably "make output 107 of decoder 22 high", which also triggers the one-shot 80 through line 107 to set the flip-flop 84 and inhibits the system via line 86. Consequently, the alarm 82 is sounded and the run/stop flip-flop 84 is flipped for placing the controller in the stop mode.

Figure 2:
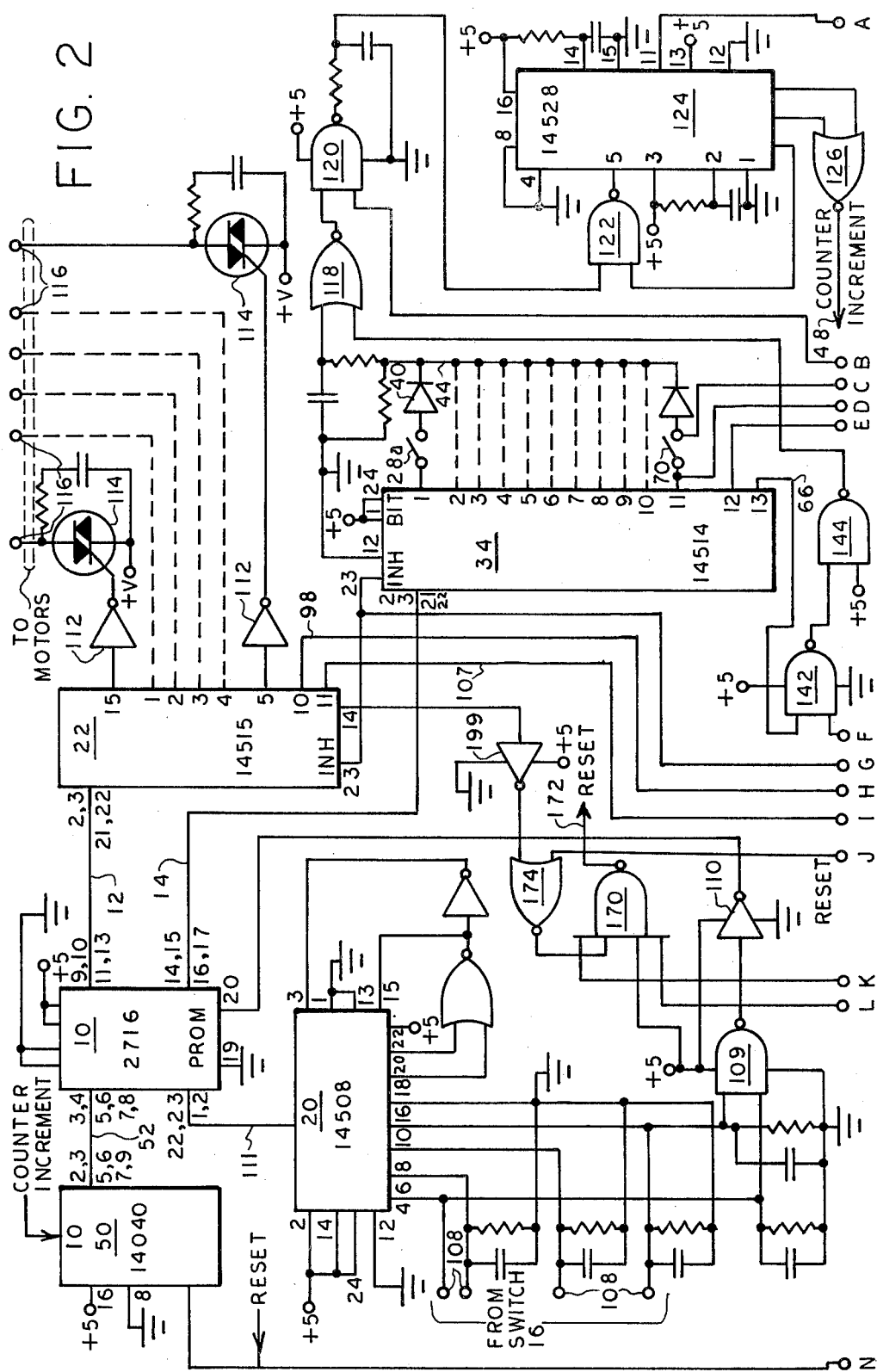
FIGS. 2-4 are schematic drawings illustrating the embodiment of FIG. 1 in more detail, and depicting other controller structure and functions not shown in FIG. 1.
Figure 3:
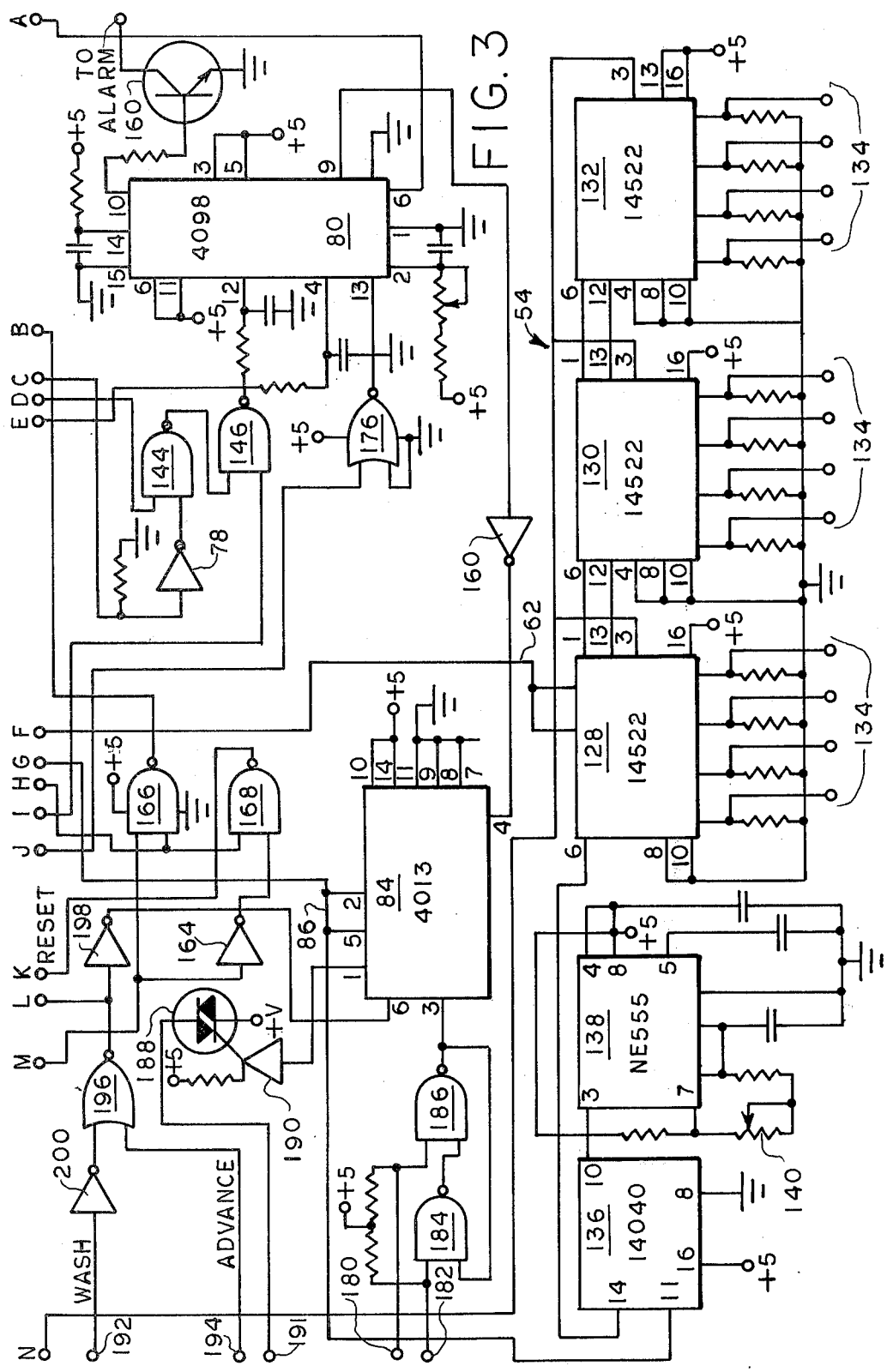
Figure 4:
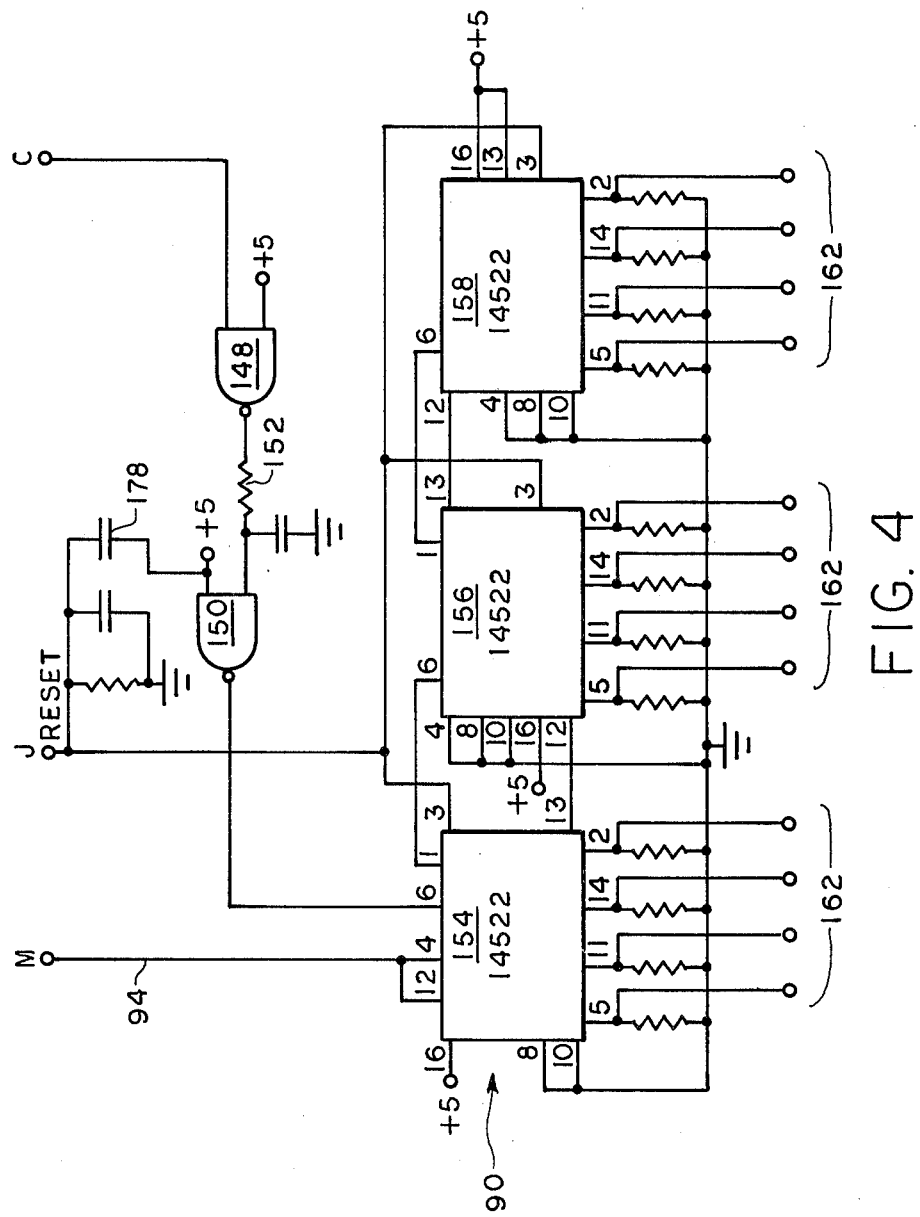

A more detailed diagram of the controller of FIG. 1 is shown in FIGS. 2-4. In the latter Figures, circuit details and operational features over and above those shown in FIG. 1 are depicted, and elements common to FIG. 1 and FIGS. 2-4 are identified by similar reference numerals. Also, commercial identifying numbers and pin numbers are shown for circuitry not shown by conventional symbols. Lines interconnecting and common to FIGS. 2-4 are identified by the same alphabetic character.

Referring first to FIG. 2, the inputs to the buffer 20 from the manual selector switch 16 are indicated as terminals 108. The latter terminals are connected to pin numbers 4, 6, 8 and 10 of the buffer 20. Pins 4 and 10 of the buffer are also coupled to the inputs of a NAND gate 109 which drives an inverter 110 whose output is coupled to pin 20 of the PROM 10.

The outputs of the buffer 20 are coupled to inputs 1, 2, 22 and 23 of the PROM 10 via a bus lead 111 which represents four leads. Where the buffer 20 is a 14508 device, its outputs pairs 5 and 17 may be coupled together and connected to input 2 of the PROM 10. Buffer output pairs 7 and 19, 9 and 21, and 11 and 23 are similarly connected to the remaining inputs of the PROM 10, all of which is represented schematically by the lead 111.

In like manner, output lead 12 from the PROM 10 represents four actual leads coupling a data word from the PROM 10 to the decoder 22. As shown in FIG. 2, the lead 12 represents connections between output pins 9, 10, 11 and 13 of the PROM 10 and input pins 2, 3, 21 and 22 of the decoder 22. Multiple connections between other elements of FIGS. 2-4 are shown in a similar manner.

The output of the decoder 22 comprises motor control signals at output pins 1-5 and 15 thereof, each such pin being coupled via an inverter 112 to a triac 114. In response to an actuating signal from its inverter 112, a triac 114 energizes to drive a motor or other electromechanical device to which it is connected via one of the terminals 116.

Although the individual outputs from the decoder 22 are shown as being coupled to a single triac, it will be appreciated that multiple outputs from the decoder 22 may be applied to logic gates for actuating a triac when those multiple outputs have a pre-selected logical state.

The other data output from the PROM is applied via lead 14 to the indicated multiple inputs of the decoder 34. The received inputs are decoded for applying the control signal, which may be a high logic level, to one of a plurality of switches coupled to output pins 1-10. Although only a single switch 28a is illustrated, it will be understood that one switch is connected to each of the output pins 1-10.

Referring to the switch 28a, its opposite side is connected through a diode 40 to a lead 44 and thence to one input or a NOR gate 118. The non-illustrated switches from decoder outputs 2-10 are also preferably coupled through individual diodes to the lead 44.

The NOR gate 118 forms part of the counter advance generator 46 (FIG. 1), the remainder thereof comprising NAND gates 120 and 122, a flip-flop 124, and a NOR gate buffer 126. When the switch 28a (or any one of the other non-illustrated switches) closes, the control signal on the lead 44 actuates gates 118, 120 and 122, the flip-flop 124 and the gate 126 for generating a "counter increment" signal at the output 48 of the gate 126. The latter signal is applied as in input to pin 10 of the counter 50. In response, the counter 50 develops at its output lead 52 a digital count representing the next instruction in the selected protocol to be executed by the PROM 10.

As stated above, the controller preferably includes a cycle time counter 54 to insert a predetermined delay at a selected point in the programmed protocol. In FIG. 3, the cycle time counter 54 comprises counters 128, 130 and 132. Each of these counters may be pre-set to a desired delay time by coupling the digital output of a conventional delay set switch to their input terminals 134. The counter 128 also receives clock pulses at its input pin 6 from a clock comprising elements 136 and 138. The clock is adjustable by means of a variable resistor 140.

When the counters 128-132 have been incremented or decremented to the pre-set count, they develop a signal on the lead 62, the latter of which is coupled via a terminal F to one input of a gate 142 (FIG. 2). The other input to the gate 142 is developed at the output lead 66 of the decoder 34 when the PROM reaches the point in the protocol which is programmed for a delay. Thus, when the counters 128-132 have "timed out", the two inputs to the gate 142 cause the latter to be actuated. The output of the gate 142 is applied to a NAND gate 144 and thence to one input of the NOR gate 118. When the gate 118 receives the last-mentioned signal, the flip-flop 124 is actuated for generating a "counter increment" signal. The counter 50 and the PROM 10 are thus advanced for indexing to the next memory address.

To sense the presence of a cup or other workpiece at a work station and to inhibit the protocol when the absence of a cup is detected, the more general embodiment of FIG. 1 utilizes the switch 70, AND gates 74 and 76, and one-shot 80. Similar functions are provided according to the embodiment of FIGS. 2 and 3 by the switch 70 (FIG. 2), inverter 78, NAND gates 144 and 146 and one-shot 80 (FIG. 3), and NAND gates 148 and 150 of FIG. 4. Specifically, the PROM 10 causes the decoder 34 to generate a high signal at its output pin 11 for application to one side of the switch 70 and, via terminal D, to one input of the NAND gate 144. The other side of the switch 70 is coupled via terminal C through the inverter 78 to the other input of the AND gate 144. The output of the gate 144 is applied to one input of the AND gate 146, the output of which is coupled to an input pin 12 of the one-shot 80.

In addition, terminal C is coupled to one input of the NAND gate 148, the other input of which is returned to a positive voltage supply. The output of the gate 148 is coupled through a resistor 152 to one input of the NAND gate 150. The other input of the gate 150 is held high by connection to the positive voltage supply.

The output of the gate 150 is coupled to input pin 6 of a counter 154 which, together with counters 156 and 158, form the cycle counter 90 of FIG. 1.

By this illustrated arrangement, the switch 70 remains open when no workpiece is at the work station, whereby the gate 144 is enabled, and the gate 146 actuates the one-shot 80. The resultant signal developed at pin 9 of the one-shot 80 is inverted by an inverter 160 and applied to pin 4 of the run/stop flip-flop 84. The latter responds by generating an inhibit signal at lead 86 for inhibiting the clock counter 136 and, via terminal G, the decoders 22 and 34. In addition, the one-shot 80 generates an output at its pin 10 for driving a transistor 160 which drives an alarm for indicating that the system is in the "stop" mode.

When the switch 70 is closed by the presence of a workpiece at the work station, a signal is applied to the NOR gate 118 via lead 44 for incrementing the counter 50 and for advancing the PROM to its next address. In addition, the NAND gate 144 is disabled, the one-shot 80 is triggered for setting the run/stop flip-flop 84 to the "run" mode, and the NAND gate 148 is enabled. By operation of the gates 148 and 150, the counter 154 of cycle counter 90 is decremented from the count pre-set therein via digital signals at terminals 162. The latter terminals may be coupled to the output of a conventional cup (workpiece) number set 88 as indicated in FIG. 1.

As long as the cycle counter 90 has not been decremented to its pre-set count, output lead 94 of counter 154 assumes a high logic state which is coupled via terminal M to an inverter 164 and to one input of a NAND gate 166 (FIG. 3). The output of the inverter 164 is applied to one input of a NAND gate 168, the other input to which is received via terminal H and output lead 98 of the decoder 22 (FIG. 2). As mentioned previously, the signal on the output lead 98 is driven high momentarily at the next to the last step of a protocol. That same high signal is applied via terminal H as an input to the NAND gate 166. Hence, at the end of a protocol, but before the counter 90 has been decremented to its pre-set count, the gate 166 is disabled and gate 168 is enabled. The resultant output of the gate 168 is applied via terminal K to one input of a NAND gate 170, the latter of which develops a reset signal at its output 172 for resetting the counter 50 and the cycle time counter 54 (FIG. 3) via terminal N.

When the counter 90 has not been fully decremented and the signal at output lead 98 is low (indicating an unfinished protocol), the operation of the gate 166 causes the NAND gate 120 FIG. 2) to call for a counter-increment signal to be generated by the flip-flop 124 for advancing the PROM to its next address.

When the cycle counter 90 is fully decremented at the end of a protocol (indicating that all samples have been treated according to the protocol), its output lead 94 (FIG. 4) goes low when line H goes high, therefore enabling AND gate 168. The AND gate 168 is connected through line K to counter advance generator 46 so as to advance the counter 50 to the address of the last instruction in the designated region of the PROM 10. This makes line 107 from the decoder 22 go high and triggers the one-shot 80 to set the run/stop flip-flop 84 to the "stop" mode. The "inhibit" signal described above is then generated to stop the controller.

Other features of the controller shown in FIGS. 2–4 include a manual reset capability. Referring to FIG. 4, a cycle reset terminal J is included for connection to a manual push-button (not shown). When the push-button is depressed, the cycle counter 90 is reset. The reset signal is also received at terminal J of FIG. 2 and applied through a NOR gate 174 to one input of the NAND gate 170 for resetting the counter 50 and the cycle timer counter 54. The same reset signal is received at terminal J of FIG. 3 and applied to an inverter 176 for triggering the one-shot 80 and resetting the run/stop flip-flop 84. Also, when the controller first receives power, a reset signal is generated by the action of a capacitor 178 (FIG. 4) which is coupled between the power source and the terminal J.

Provision is also preferably made for a manual run/-stop push-button (not shown) which may be coupled via terminals 180 and 182 (FIG. 3) to NAND gates 184 and 186. The output of the gate 186 is coupled to pin 3 of the run/stop flip-flop 84 for resetting thereof. When in the "run" mode, the Q output (pin 1) of the flip-flop 84 is low whole the $\overline{Q}$ output (pin 2) is high. In the "stop" mode, the high output at pin 1 energizes a triac 188 via an amplifier 190 for driving a lamp (not shown) coupled to terminal 191 for indicating the status of the controller.

When power is turned on, the counter 50 is preferably reset so as to direct the PROM 10 to the address of the first stop in the selected protocol region, and a stop signal is automatically initiated so that manual activation of the run/stop push-button is required to commence the protocol.

Further push-buttons for manually selecting various types of operations may also be included. For example, terminals 192 and 194 (FIG. 3) may be coupled, respectively, to a "wash" push-button and an "advance" push-button, or to push-buttons identifying other preselected protocols. The "wash" protocol may, for example, call for a number of containers to be washed, and the "advance" protocol may call for a selected number of work pieces to be advanced past the work station.

In the illustrated embodiment, the signal generated by the "advance" push-button is applied as one input to a NOR gate 196, the output of which is coupled to an inverter 198. The inverter 198, in turn, is coupled to pin 6 of the run/stop flip-flop 84.

The output of the gate 196 is also coupled via terminal L to one input of the NAND gate 170 (FIG. 2).

Thus, when the "advance" push-button is depressed, the flip-flop 84 is set to the "run" mode by the signal received at its pin 6, and a reset signal is generated by the NAND gate 170. Means (not shown) may respond to the depression of the "advance" push-button to render the buffer 20 (FIG. 2) non-responsive to inputs from the manual selector switch 16 and to input to the buffer 20 a digital signal representative of the address of an "advance" protocol already programmed in the PROM. The last instruction in the advance protocol is preferably a "reset" signal for transferring control back to the selector switch 16. Alternately, the last instruction in the "advance" protocol may place the system in a "stop" mode. The latter operation may be effected by generating a suitable signal at pin 14 of the decoder 22, which signal is coupled through an inverter 199 to gates 174 and 170 for generating a reset signal.

The signal from the "wash" push-button is received by an inverter 200 whose output drives one input of the NOR gate 196. The effect of the "wash" push-button is similar to that of the "advance" push-button except that a different protocol address is applied to the buffer 20.

It will be appreciated that the controller described herein provides a versatile and inexpensive means for controlling the functions of a variety of electro-mechanical devices. Without the use of a microprocessor or any other type of computing machine, a predetermined succession of operations are performed, each one being automatically initiated at the completion of the previous operation. The controller is particularly useful in controlling sequences of laboratory treatments, because the memory device is inexpensive, and, therefore, readily replaceable by a new memory device as laboratory protocols are changed. However, the controller may be advantageously employed in a variety of other applications in which the complexity and corresponding expense of a microprocessor controller is prohibitive, or where frequent program changes are contemplated.

Although the controller has been described in terms of a particular embodiment, it will be obvious to those skilled in the art that many alterations and modifications can be made without departing from the invention. For example, the logic structure described herein may be changed without substantially altering the functions of the controller. Accordingly, it is intended that all such alterations and modifications be included within the spirit and scope of the invention as defined by the appended claims.

What is claimed is:

1. A programmable controller for controlling the operation of electro-mechanical devices through selected protocols, comprising:

memory means adapted to be programmed with a plurality of instructions for outputting a corresponding plurality of digital output signals, each output signal being selected to actuate at least one of a plurality of electro-mechanical devices to effect a predetermined function of the actuated device, and each of said output signals being associated with a particular address in the memory means;

means for indexing said memory means to a first address;

means responsive to the completion of the predetermined function of the actuated electro-mechanical device for generating a control signal;

counting means responsive to the control signal for altering a count internal to the counting means and for advancing said memory means to the next successive address therein as the count changes, said counting means being adapted to advance said memory means through each address of a region selected by said indexing means;

whereby the electro-mechanical devices are actuated to effect a selected sequence of functions and the completion of each function causes the counting means to advance the memory means to its next successive instruction for stepping selected electro-mechanical devices through their respective functions; and selectable timing means, operable with or without the completion-responsive means, for determining the time elapsed during the selected protocol, for stopping the protocol at a selected memory address, and for resuming the protocol after a pre-selected delay.

2. A controller as set forth in claim 1 wherein said memory means includes a plurality of address regions, each such region corresponding to a different protocol to be effected by the electro-mechanical devices, and each region having a plurality of different addresses.

3. A controller as set forth in claim 2 wherein said indexing means is adapted to index said memory means to a selected address region of said memory means.

4. A controller as set forth in claim 3 wherein the electro-mechanical devices are adapted to operate on a plurality of workpieces presented individually and successively to a work station, and further including means adapted to sense the completion of a cycle of operations on a workpiece resulting from the advancement of said memory means through each address of a selected address region, to count the number of completed cycles of operations, and to reset said counting means to an initial count corresponding to a first address of the selected address region when the number of completed cycles is less than a preselected count.

5. A controller as set forth in claim 4 wherein said memory means is adapted to actuate an electro-mechanical device for advancing a new workpiece to the work station upon the completion of a cycle of operations on a previous workpiece, and further including means for sensing the presence of the new workpiece at the work station and for inhibiting the operations of the electro-mechanical devices until the new workpiece is located at the work station.

6. A controller as set forth in claim 1 wherein each digital output signal of the memory means includes two sets of data, and further including a first decoder receiving the first set of data for actuating at least one selected electro-mechanical device in accordance with the received data, and wherein said control signal generator includes a second decoder receiving the second set of data for identifying which electro-mechanical device is actuated.

7. A controller as set forth in claim 6 wherein said control signal generator includes a plurality of switches each associated with one of the electro-mechanical devices, and wherein said second decoder applies the control signal to the switch associated with the actuated electro-mechanical device, and including means coupling each electro-mechanical device to its associated switch for closure thereof on completion of the function of the actuated electro-mechanical device, whereby the control signal is conducted to the output of a switch each time an electro-mechanical device completes its function.

8. A controller as set forth in claim 7 wherein said switches are coupled in parallel with one another to an input of said counting means, whereby said counter counts each control signal for advancing the memory means to the next successive memory address.

9. A controller as set forth in claim 8 wherein said memory means includes a plurality of address regions, each such region corresponding to a different sequence of functions to be effected by the electro-mechanical devices, and each region having a plurality of different addresses.

10. A controller as set forth in claim 9 wherein said indexing means is responsive to manual manipulation for indexing said memory means to an initial address in a selected memory region, and said counting means advances said memory means through all addresses of a region selected by said indexing means.

11. A programmable controller for controlling the application of laboratory protocols to a plurality of samples within containers, wherein the samples are treated by actuation of one or more electro-mechanical devices, comprising:

memory means having a plurality of address regions each associated with a different laboratory protocol, each such address region containing a plurality of addresses each associated with a digital output signal for actuating at least one electro-mechanical device to effect a given treatment on a sample located at a work station, each output signal comprising a first set of binary data for actuating at least one selected electro-mechanical device and a second set of binary data for identifying the device to be actuated;

indexing means responsive to manual manipulation for indexing said memory means to an initial address within an operator-selected address region such that said memory means outputs the digital output signal associated with the initial address;

a first decoder receiving the first set of data for actuating at least one electro-mechanical device identified by the first set of data for effecting a first treatment of the sample at the work station;

a second decoder receiving the second set of data and having a plurality of outputs which are individually associated with a particular electro-mechanical device, and responsive to the second set of data for applying a control signal to the output associated with the actuated electro-mechanical device;

a plurality of switches each coupled to one output of said second decoder, each associated with an electro-mechanical device, and adapted to be actuated when its associated device completes its treatment;

a counter having an input coupled to said switches for counting control signals passed by said switches upon actuation thereof, and adapted to advance said memory means to the next successive address in the selected memory region, whereby said memory means is stepped successively through the addresses within the selected memory region for successively actuating the electro-mechanical devices so as to complete a given protocol on the sample at the work station; and further including selectable timing means, operable with or without the completion-responsive switches, for determining the time elapsed during the selected protocol, for stopping the protocol at a selected memory address, and for resuming the protocol after a preselected delay.

12. A controller as set forth in claim 11 wherein the electro-mechanical devices are adapted to operate on a plurality of samples presented successively to the work station, and including means adapted to sense the completion of a protocol on a sample at the work station, to count the number of protocols completed on successive samples, and to reset the counter to an initial count corresponding to the initial address of the selected address region when less than a pre-selected number of protocols have been completed, whereby the same protocol is applied to successive samples until a known number of samples, corresponding to the pre-selected number, have been completed.

13. A controller as set forth in claim 12 wherein said memory means is adapted to output a signal for advancing a new sample to the work station upon the completion of the protocol on a previous sample, and further including means for sensing the presence of the new sample at the work station and for inhibiting further operation of the protocol until the new sample is located at the work station.

* * * * *